March 16, 1926.                                                    1,577,298
M. A. ROELLER
ARTICLE CARRIER
Filed Dec. 4, 1924
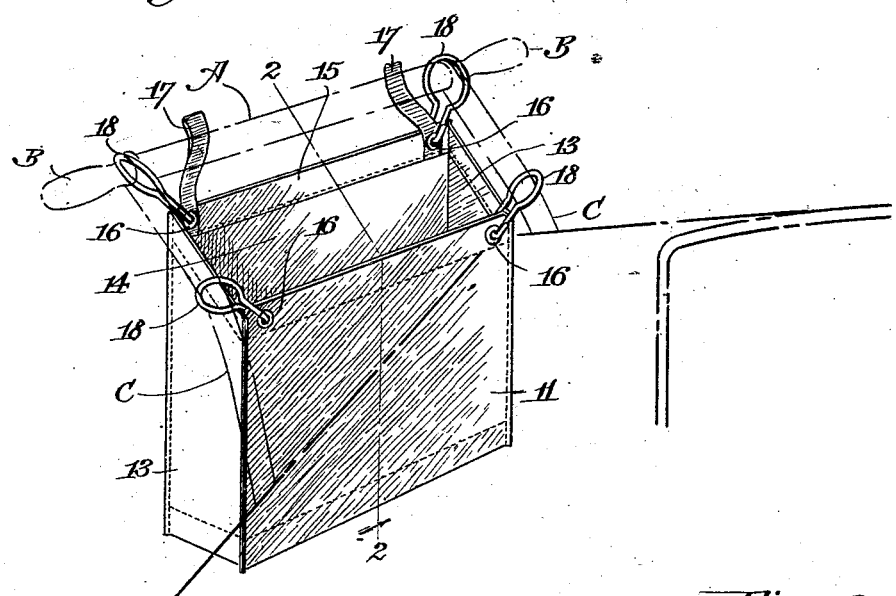
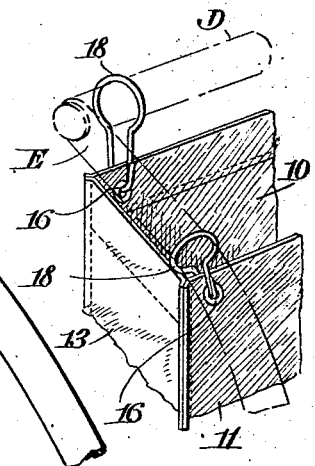
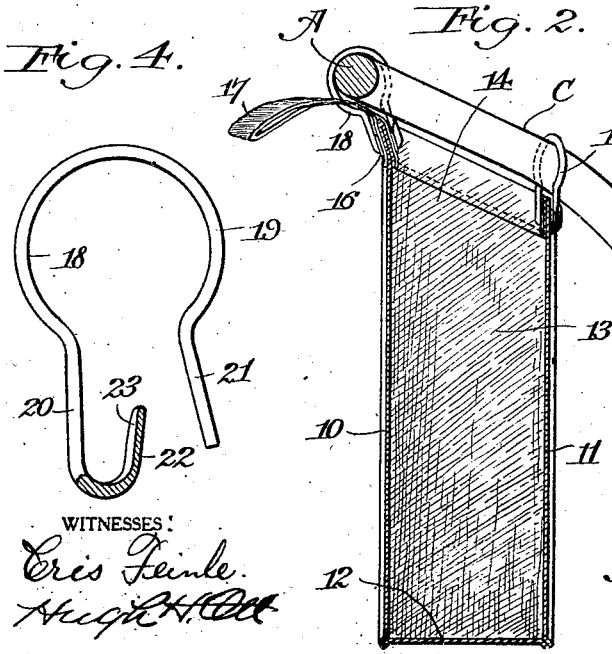
WITNESSES:
INVENTOR
Mary A. Roeller.
BY
ATTORNEYS.

Patented Mar. 16, 1926.

1,577,298

UNITED STATES PATENT OFFICE.

MARY AUGUSTA ROELLER, OF ASTORIA, NEW YORK.

ARTICLE CARRIER.

Application filed December 4, 1924. Serial No. 753,944.

*To all whom it may concern:*

Be it known that I, MARY A. ROELLER, a citizen of the United States, and a resident of Astoria, borough of Queens, in the county of Queens and State of New York, United States of America, have invented a new and Improved Article Carrier, of which the following is a full, clear, and exact description.

This invention has relation to article carriers and has particular reference to a carrier for packages or parcels, the same being especially designed for use in connection with baby carriages.

One of the principal objects of the present invention is to provide an improved article carrier for baby carriages which constitutes a convenient means for transporting parcels and packages, and which is provided with means facilitating the application to or removal of the carrier from the baby carriage handle bars.

The invention furthermore contemplates a flexible article carrier of substantially box-like configuration, in which the means for supporting the same from the baby carriage handle bars serves to maintain the mouth in open condition when the carrier is applied.

The invention furthermore comprehends an article carrier of the class described which is constructed in such a manner as to fit between the end and side members of the handle bar whereby the main body portion of the carrier depends vertically therefrom and presents a neat appearance which does not materially detract from the carriage.

The invention furthermore resides in the provision of an improved article carrier which is extremely simple in its construction, inexpensive to manufacture and produce, and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a perspective view of the article carrier in applied position to the handle bar structure of a baby carriage, the latter being illustrated in broken lines.

Fig. 2 is a vertical longitudinal sectional view therethrough taken approximately on the line indicated at 2—2 in Fig. 1.

Fig. 3 is a fragmentary perspective view illustrating the application of the device to a handle bar of a slightly different construction.

Fig. 4 is a side view of one of the detachable spring clip attaching and supporting elements.

Referring to the drawings by characters of reference, the article carrier consists of a substantially box-like body including front and rear walls 10 and 11, a bottom wall 12 and side walls 13 which are preferably constructed of canvas or any other suitable flexible material. The upper open end of the structure defines a mouth 14 for the introduction or removal of the packages, parcels or other articles from the body. The front and rear walls adjacent their upper edges are doubled upon themselves to provide a hem 15 and said hemmed portions adjacent the side walls are provided with eyelets or grommets 16. The front wall eyelets or grommets also pass through the ends of looped carriers 17 for attaching the same to the front wall of the carrier. In order to provide means for detachably suspending or supporting the carrier from the handle bar structure detachable spring clip elements 18 are employed, each of which consists of a substantially enlarged ring-shaped portion 19 having radially projecting legs 20 and 21, the former being provided with a hook shaped terminal 22 which is of substantially semi-circular formation to provide a keeper 23 within which the free terminal of the leg 21 is engaged to hold the clip in closed condition.

Baby carriage handle bar structures are of two general types, namely, those as illustrated in Fig. 1 in which the cross member A is provided with laterally projecting terminals B which extend beyond the side members C and those as illustrated in Fig. 3 in which the cross member D extends merely to the side members E. When the device is used in connection with handle bar structures as illustrated in Fig. 1, it is only necessary to open the spring clips 18 to engage the same around the side members C with the hooked ends engaged in the eyelets or grommets 16, while the remaining spring clips 18 which are engaged in the eyelets or grommets 16 of the front wall are engaged over the laterally projecting terminals B. In the latter type of handle bar structure as illustrated in Fig. 3 it is necessary to open both sets of spring clips 18 so that the same may embracingly engage both the cross and side members D and E.

In order to maintain the main body portion of the carrier in a vertical position thereby compensating for the downwardly inclining or declining configuration of the side members C and E, the upper end of the carrier is cut at an angle that is the front wall 10 is of greater height than the rear wall 11, while the side walls 13 are cut at an angle which follows the downward inclination or declination of the side members C or E. When the spring clip elements are engaged with the handle bar structure it will be noted that the mouth 14 is maintained in an opened condition to facilitate the inclination or removal of the articles from the carrier. When the device is removed from the handle bar it is carried by means of the looped elements 17.

I claim:

1. As a new article of manufacture, an article carrier consisting of a flexible box-like structure having an open upper end defining a mouth for the introduction to or removal of the articles therefrom, and elements at the upper end thereof for detachably supporting and suspending said carrier from the handle bar structure of a body carriage, said elements engaging respectively the horizontal cross member and sloping side members of the handle bar structure whereby to gravitationally maintain the mouth of the carrier in an open position when applied to facilitate the introduction to and removal of the articles therefrom.

2. As a new article of manufacture, an article carrier consisting of a flexible box-like structure having an open upper end defining a mouth for the introduction to or removal of the articles therefrom, and elements at the upper end thereof for detachably supporting and suspending said carrier from the handle bar structure of a baby carriage, said elements engaging respectively the horizontal cross bar and downwardly inclined side members of the handle bar structure whereby to maintain the mouth of the carrier in an open position when applied to facilitate the introduction to and removal of the articles therefrom, the upper open end of the carrier being inclined whereby the lower detachable supporting elements sliding downwardly on the declining portion of the side handle bar members gravitationally hold the carrier mouth open with the major body portion of the carrier suspended vertically.

3. As a new article of manufacture an article carrier including a flexible box-like structure having front and rear walls of different heights and side walls with sloping upper edges connecting the upper corners of the front and rear walls, hangers detachably secured to the upper corners of the structure, the pair of hangers associated with the higher wall being adapted for attachment to the horizontal cross bar of a baby carriage, the other pair of hangers being adapted for attachment to the sloping side rails of a baby carriage whereby the structure hangs in vertical position, with the mouth thereof held gravitationally opened.

MARY AUGUSTA ROELLER.